United States Patent

[11] 3,578,147

[72] Inventor Robert Benjamin Bolton
 14, Middle Drive, Ponteland,
 Northumberland, England
[21] Appl. No. 794,549
[22] Filed Jan. 28, 1969
[45] Patented May 11, 1971
[32] Priority Jan. 31, 1968
[33] Great Britain
[31] 5002/68

[54] CHAIN CONVEYOR
 6 Claims, 4 Drawing Figs.
[52] U.S. Cl. .................................................. 198/171,
 198/229
[51] Int. Cl. ..................................................... B65g 45/00
[50] Field of Search ........................................... 198/170,
 171, 229

[56] References Cited
 UNITED STATES PATENTS
 2,368,114  1/1945  Cartlidge ...................... 198/229
 2,847,115  8/1958  Ferris ........................... 198/229
 3,472,556  10/1969  Bolton .......................... 198/171

Primary Examiner—Richard E. Aegerter
Attorney—Jacobs & Jacobs

ABSTRACT: Improvements in chain conveyors of the type comprising a trough to receive the materials being conveyed, and endless chain to one side of the trough extending therealong between end sprockets, a series of flights spaced along and below the chain and pivotally attached at one end to the chain, there being means adapted to maintain the flights transversely to the trough throughout the driving run of the chain whereby the working parts of the flights cause the materials to flow along the trough and further adapted to cause or permit rotation of the flights about their pivots at the completion of each driving run so that they assume a trailing attitude relative to their pivots during the return run.

The improvements include the provision of a scraper edge arranged at the discharge end of the conveyor so as to closely overlie the flat upper surface of each oncoming flight in a region adjacent its pivot. The flights are withdrawn underneath the scraper edge so that the flat upper surface of each flight passes progressively beneath the scraper edge from said region adjacent the pivot point to the end remote from the pivot.

PATENTED MAY 11 1971

3,578,147

INVENTOR
ROBERT BENJAMIN BOLTON
By Jacobs & Jacobs

CHAIN CONVEYOR

This invention relates to endless chain conveyors. In particular it relates to chain conveyors of the type comprising a trough to receive the materials being conveyed, an endless chain to one side of the trough extending therealong between end sprockets, a series of flights spaced along and below the chain and pivotally attached at one end to the chain, there being means adapted to maintain the flights transversely to the trough throughout the driving run of the chain whereby the working parts of the flights cause the materials to flow along the trough and further adapted to cause or permit rotation of the flights about their pivots at the completion of each driving run so that they assume a trailing attitude relative to their pivots during the return run. One example of a conveyor of this type is disclosed in the specification of my copending U.S. Pat. application No. 657,883 filed Aug. 2, 1967, now U.S. Pat. No. 3,472,556, issued Oct. 14, 1969.

One of the major difficulties which has been encountered with scraper chain conveyors has been the tendency of the conveyor to carry back some of the material being conveyed into the return run. This is disadvantageous for the following reasons:

a. the conveyor motor is doing unnecessary work.
b. there are disposal problems for the returned material.
c. lumps of hard material brought back on the return run may damage the conveyor, if the return run is working in a confined space.
d. if the conveyor is allowed to rest for a period with certain types of material in the return run, this material may become hard and cause an excessive load on the engine on restarting, as well as possible injury to the sprockets round which the chains pass.

An object of the present invention is to provide a scraper chain conveyor in which the amount of material brought back into the return run is minimized.

According to the present invention there is provided a conveyor of the type described characterized by the provision of a scraper edge arranged at the discharge end of the conveyor so as to closely overlie the flat upper surface of each oncoming flight in the region adjacent its pivot, the flights being withdrawn underneath the scraper edge whereby the flat upper surface of each flight passes progressively beneath the scraper edge from the said region adjacent the pivot to the end remote from the pivot.

In a preferred form a part at least of the scraper edge slopes downwardly in the direction of travel of the flights so as to engage the leading edge of each flight in turn at the completion of its driving run and cause said rotation about its pivot.

Thus, in conveyors of the present invention there is ensured the virtually complete discharge of the materials conveyed, because little or no materials are carried around into the return run. The efficiency and operational life of the conveyor is therefore greatly increased. Provision of a sloping scraper edge ensures that the scraper edge is close to the flat upper surface of each flight even when the height of a flight is reduced as a result of wear.

One embodiment of the invention, given by way of example, will now be described with reference to the accompanying drawings wherein.

Figure 3:
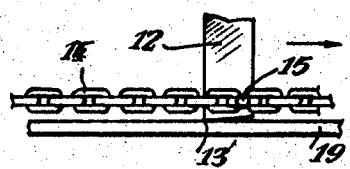
FIG. 3 is a detail plan view of the inner end of a flight.

Referring to the drawings, the conveyor includes a trough 10 along which material is moved in the direction of the arrow by a series of flights 12 pivoted to a chain 14 (shown partly in dot-dash lines in FIG. 2) which operates under a protective housing 16. In its return path the chain passes along a closed channel 18 after passing around an end return sprocket 20. A similar sprocket is provided at the other end of the conveyor (not shown). The chain 14 is driven through the sprocket 20 by a motor 21. The sprocket 20 is borne on the lower end of its axle; there being a clear space below the sprocket for passage of the flights between the driving and return runs.

Each flight 12 is pivotally connected at its inner end to the chain 14 by means of a pivot pin 15 fast with a link of the chain, depending downwardly therefrom and journaled to the leading inner end of the flight. The flight is provided at its inner end with a trailing portion 13 which, during the driving run, bears upon a fixed wall 19 which extends longitudinally along the conveyor and thereby maintains the flight transversely to the trough during the driving run. The wall 19 terminates adjacent the discharge end of the trough so that the flights may be free to pivot about the pivot pins 15.

Each flight 12 has a flat upper surface 30 and rests on a depending front wall 32 and a rearwardly directed ridge 34. The ridge enables the flights to ride more easily over junctions between section of trough 10.

Figure 4:
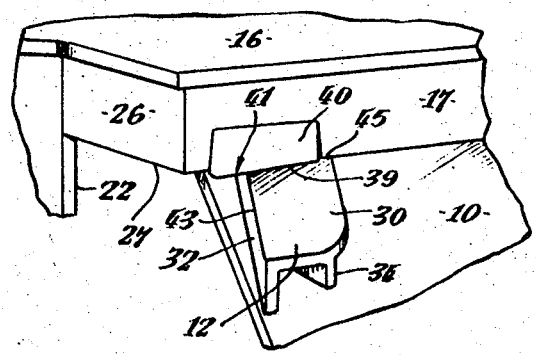
FIG. 4 is a perspective view of part of the discharge end of the conveyor.

A replaceable scraper plate 40 is secured to the sidewall 17 of the housing 16 adjacent the discharge end of the conveyor. The lower, scraper edge 39 of the plate 40 slopes downwardly towards the discharge end of the conveyor, i.e. in the direction of travel of the flights. As each flight, pivoted to the chain, approaches the discharge end of the trough 10 its leading edge 43, between the upper surface 30 and depending wall 32, engages the scraper edge 39 of the plate 40 at some point 41 at which the space below the plate 40 is equal to the height of the wall 32. The forward movement of the flight at the point of engagement 41 is arrested, but the pivoted inner end continues to move with the chain 14. The flight is thus caused to rotate about its pivot pin 15 and at the same time be withdrawn from the trough under the sidewall 17. Since the pivot during this period is travelling around the sprocket 20, the pivotal movement of the flight about the point 41 is relatively little, being first anticlockwise and then clockwise as viewed from above. The flight is thus drawn substantially longitudinally from the trough and under the sidewall 17. This is shown in two successive stages in FIGS. 2 and 4. During this withdrawal the upper surface 30 of the flight is scraped partly by the scraper edge 39 of the plate 40, and partly by the lower edge 45 of the adjacent portion of the sidewall 17; this can be best seen in FIG. 4. The edge 45 thus also acts as a scraper edge.

In the course of use the wall 32 and ridge 34 will become worn as the result of sliding over the trough 10, and the height of each flight will be reduced. In addition, of course, the plate 40 itself will become worn, although it would normally be made of wear-resistant material. Thus, in the course of time the point of engagement 41 will progressively shift towards the discharge end of the conveyor. The danger will eventually arise that some flights will not engage the plate, and when this happens the plate can be replaced.

Figure 1:
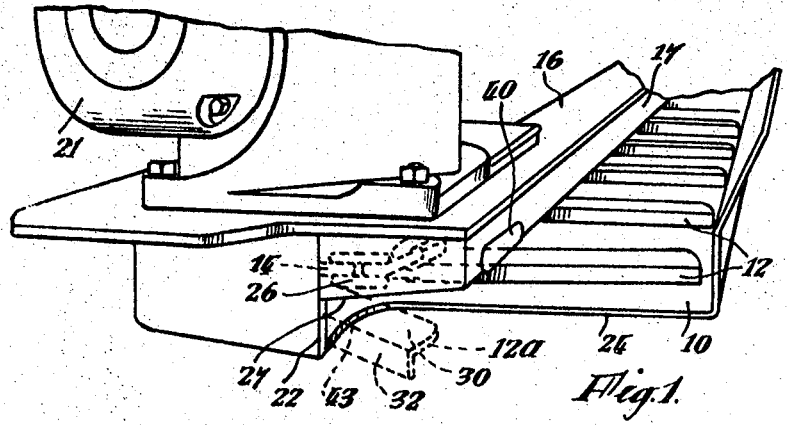
FIG. 1 is a perspective view of part of a conveyor and scraper plate.
Figure 2:
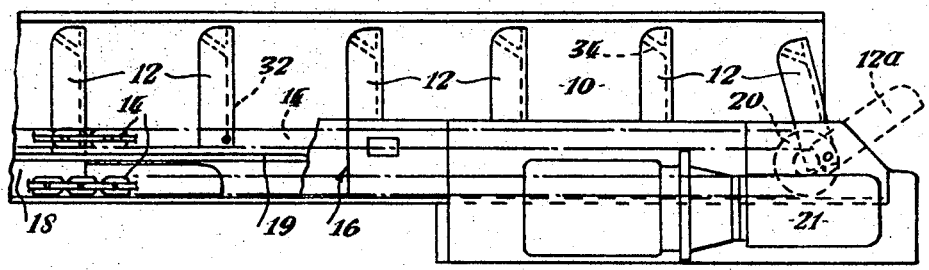
FIG. 2 is a plan view, partly cutaway, of part of the conveyor of FIG. 1.

The embodiment shown can also be used without the scraper plate 40. The resulting behavior of the flights at the discharge end of the conveyor is illustrated in FIGS. 1 and 2 in broken lines by the flights 12a. As each flight reaches the discharge end of the trough 10 it swings round and strikes a fixed vertical edge portion 22 on the conveyor. This edge 22 has the same effect as the point of engagement 41 of the plate 40, and the flight 12a rotates about its pivot pin 15 and is withdrawn substantially longitudinally under the housing 16. A plate 26, which is in effect a continuation of the sidewall 17 is located adjacent the edge 22, and its lower edge 27 is arranged so as to scrape the upper surface 30 of the flight 12a as it is withdrawn.

Whichever method of arresting the flight is used, it will be seen that at the completion of the driving run each flight pivots about is pivot pin 15 and passes underneath the sprocket 20 so that as the chain passes into the return channel 18 the flight is lying parallel to and underneath the chain in a trailing attitude relative to its pivot pin 15.

The provision of the flat upper surface on the flights 12 itself tends to increase the operational efficiency of the conveyor because a ridge of the materials being conveyed tends to build up on the flat surface and increase the quantity of material which can be pushed forward by each flight.

On coming to the edge 24 of the trough 10, the materials between the flights fall away to a suitable discharge point (not shown). The ridge of materials built-up on the flat upper surface 30 of the flights is substantially completely removed by the scraper edges 45, 39 or 27 in the manner hereinbefore described. It will be seen that substantially the entire flat upper surface of each flight is scraped. The term "substantially" is used so as to exclude from consideration that small inner end portion of the flight which lies permanently under the housing 16 during the driving run.

It has been found that in most cases the effective scraping of the flights occurs using the wedge-shaped scraper plate 40 rather than the scraper plate 26 and vertical edge 22. Of course, the two alternative methods need not exist simultaneously in the same conveyor. They are so shown in the drawings merely for the sake of convenience, and because it may be desired to provide the second scraping means as a safeguard against any flights failing to engage the plate 40.

I claim:

1. A chain conveyor, comprising a trough to receive the materials being conveyed, an endless chain to one side of the trough extending therealong between end sprockets, a series of flights spaced along and below the chain and pivotally attached at one end to the chain, each of said flights having a flat upper surface, means adapted to maintain the flights transversely to the trough throughout the driving run of the chain whereby the working parts of the flights cause the materials to flow along the trough, means adapted to cause or permit rotation of the flights about their pivots at the completion of each driving run so that they assume a trailing attitude relative to their pivots during the return run, and a scraper edge mounted at the discharge end of the conveyor and arranged to closely overlie the flat upper surface of each oncoming flight in the region adjacent its pivot such that as the flights are withdrawn underneath the scraper edge the flat upper surface of each flight passes progressively beneath the scraper edge from the said region adjacent the pivot to the end remote from the pivot.

2. A conveyor according to claim 1 wherein a part at least of the scraper edge slopes downwardly in the direction of travel of the flights so as to engage the leading edge of each flight in turn at the completion of its driving run and cause said rotation about its pivot.

3. A conveyor according to claim 2 wherein the sloping scraper edge is provided by a replaceable plate of wear-resistant material secured to the conveyor.

4. In a conveyor of the type comprising a trough to receive the materials being conveyed, an endless chain to one side of the trough extending therealong between end sprockets, a series of flights spaced along and below the chain and pivotally attached at one end to the chain, there being means adapted to maintain the flights transversely to the trough throughout the driving run of the chain whereby the working parts of the flights cause the materials to flow along the trough and further adapted to cause or permit rotation of the flights about their pivots at the completion of each driving run so that they assume a trailing attitude relative to their pivots during the return run, the improvement of:

i. flights having flat upper surfaces, ii. flight-arresting means located adjacent the sprocket at the discharge end of the conveyor and adapted to engage each flight in turn outwardly of its pivot at the completion of its driving run so as to cause said rotation about its pivot whereby the flight is withdrawn substantially longitudinally under the said sprocket and into the return run, and iii. a scraper edge arranged at the discharge end of the conveyor so as to closely overlie the flat upper surface of each flight in the region adjacent its pivot on engagement with said flight-arresting means whereby on withdrawal of the flight under said end sprocket the flat upper surface of the flight is scraped progressively from the said region adjacent to the pivot to the end remote from the pivot.

5. A conveyor according to claim 4 wherein the flight-arresting means is provided by a part at least of the scraper edge which slopes downwardly in the direction of travel of the flights so as to engage the leading edge of each flight in turn at the completion of its driving run and cause said rotation about its pivot.

6. A conveyor according to claim 5 wherein the sloping scraper edge is provided by a replaceable plate of wear-resistant material secured to the conveyor.